(12) United States Patent
Kim et al.

(10) Patent No.: US 7,616,537 B2
(45) Date of Patent: Nov. 10, 2009

(54) FOCUS SEARCH APPARATUS AND METHOD

(75) Inventors: Je-kook Kim, Kyungki-do (KR); Suk-jung Lee, Yongin (KR); Young-wook Jang, Yongin (KR)

(73) Assignee: Samsung Electronics Co., Ltd. (KR)

( * ) Notice: Subject to any disclaimer, the term of this patent is extended or adjusted under 35 U.S.C. 154(b) by 644 days.

(21) Appl. No.: 10/677,192

(22) Filed: Oct. 2, 2003

(65) Prior Publication Data
US 2004/0090884 A1 May 13, 2004

(30) Foreign Application Priority Data

| Nov. 7, 2002 | (KR) | ............... 10-2002-0068859 |
| Nov. 7, 2002 | (KR) | ............... 10-2002-0068860 |
| Nov. 9, 2002 | (KR) | ............... 10-2002-0069418 |

(51) Int. Cl.
*G11B 7/095* (2006.01)

(52) U.S. Cl. .............. 369/44.29; 369/44.34; 369/44.35

(58) Field of Classification Search .............. 369/53.28, 369/44.27, 44.29, 44.34, 44.35
See application file for complete search history.

(56) References Cited

U.S. PATENT DOCUMENTS

| 4,328,579 | A | * | 5/1982  | Hashimoto et al. ........... 370/210 |
| 4,744,069 | A | * | 5/1988  | Sugiyama et al. ......... 369/44.29 |
| 5,642,340 | A | * | 6/1997  | Nomura .................... 369/44.25 |
| 5,675,561 | A | * | 10/1997 | Yoshioka .................. 369/44.25 |
| 5,682,372 | A | * | 10/1997 | Yamakawa et al. ............ 369/94 |
| 5,848,036 | A | * | 12/1998 | Ishibashi et al. ......... 369/44.29 |
| 5,912,867 | A | * | 6/1999  | Miyazono ................ 369/44.27 |
| 6,154,425 | A | * | 11/2000 | Iida et al. ................. 369/44.29 |
| 6,490,234 | B1 | * | 12/2002 | Okamoto et al. ......... 369/44.25 |
| 6,603,717 | B1 | * | 8/2003  | Kawada et al. ........... 369/44.29 |
| 7,012,858 | B1 | * | 3/2006  | Jeong et al. .............. 369/44.11 |
| 2003/0026178 | A1 | * | 2/2003 | Hirashima ............... 369/44.29 |

FOREIGN PATENT DOCUMENTS

| JP | 06-111346  |   | 4/1994  |
| JP | 10-055546  |   | 2/1998  |
| JP | 10055546   | * | 2/1998  |
| JP | 10-069657  |   | 3/1998  |
| JP | 10-143879  |   | 5/1998  |
| JP | 2000-348354|   | 12/2000 |
| KR | 100176897  |   | 4/1999  |

OTHER PUBLICATIONS

Machine translation of JP-2000348354 published in Jan. 15, 2000 by Endo Hideyasu.*
First Office Action and English-language translation issued Sep. 8, 2006 in counterpart Chinese application 200310114805.0.

* cited by examiner

*Primary Examiner*—Wayne R Young
*Assistant Examiner*—Linh T Nguyen
(74) *Attorney, Agent, or Firm*—Mills & Onello, LLP

(57) ABSTRACT

Provided are a focus search apparatus and method for performing a focus search after moving an optical pickup to a focus-on point according to a signal output from a sine wave generator so that a stable and smooth focus search is performed. In the focus search method, a sine wave is generated in response to a focus search command. The focus search is performed using an optical pickup in response to the sine wave. The optical pickup is driven in response to an amplitude of the sine wave during the focus search and in response to a filtered focus error signal during a focus servo.

19 Claims, 14 Drawing Sheets

FOCUS SEARCH APPARATUS AND METHOD

BACKGROUND OF THE INVENTION

This application claims the priority of Korean Patent Application No. 2002-68859, filed on Nov. 7, 2002, Korean Patent Application No. 2002-68860, filed Nov. 7, 2002 and Korean Patent Application No. 2002-69418, filed on Nov. 9, 2002, in the Korean Intellectual Property Office, the contents of which are incorporated herein in their entirety by reference.

1. Field of the Invention

The present invention relates to a focus search apparatus, a focus search method, and a focus search waveform generator used in an optical system, and more particularly, to a focus search apparatus and method by which an optical pickup is moved to a focus-on point in response to a signal output from a sine wave generator, after which a focus servo is carried out.

2. Description of the Related Art

FIG. 1 is a block diagram which schematically illustrates a focus servo operation of a general optical system. Referring to FIG. 1, an optical pickup 20 reads data recorded on an optical disc 10. A focus loop filter 30 receives a focus error signal FE output from the optical pickup 20 and outputs a focus output drive signal FOD for a focus servo to an actuator (not shown) mounted in the optical pickup 20 in response to the focus error signal FE. Here, LD and PD denote a laser diode and a photodiode, respectively.

FIG. 2 shows a waveform of a signal output from the focus loop filter 30 shown in FIG. 1. Here, the signal is a triangular wave. The triangular wave is generally generated using an up/down counter (not shown).

A conventional focus search and a focus servo will be described with reference to FIGS. 1 and 2. In order to record or play back a signal on or from the optical disc 10, the optical pickup 20 must be controlled by a focus servo.

If the optical pickup 20 is close to a focused position with respect to the optical disc 10, the optical pickup 20 can generate an S-shaped focus error signal FE. Also, if the optical pickup 20 is positioned within a range corresponding to the range between the maximum value and the minimum value of the S-shaped focus error signal FE, the optical pickup 20 can perform the focus servo.

Accordingly, in order to carry out the focus servo, before the focus servo, the optical pickup 20 has to move to a position within the range in which performing the focus servo is possible. That is, the optical pickup 20 has to move to a position within a range corresponding to the range between the maximum value and the minimum value of the S-shaped focus error signal FE. This operation is referred to as a focus search.

For example, during section a of the curve in FIG. 2, the optical pickup 20 moves away from the optical disc 10 downward. In section b, the optical pickup 20 moves toward the optical disc 10. In section b, the optical pickup 20 performs the focus search and then the focus servo from a focus-on point, i.e., a point in which the focus error signal FE is zero. Thus, a waveform after the focus-on point, i.e., if the focus search succeeds, is a signal for allowing the optical pickup 20 to perform the focus servo.

Referring to FIGS. 1 and 2, since a triangular wave is used in the conventional focus servo, an objective lens (not shown) of the optical pickup 20 vibrates due to a fluctuation in a voltage when performing a focus search. Also, in a case where a voltage difference between the maximum value and the minimum value of a focus error is great and a level of the focus search is low, it is difficult to stably perform a focus servo.

For example, the optical pickup 20 performs a focus search from a focus search start point (SSP) during section b. The optical pickup 20 also performs a focus servo from a focus-on point, i.e., a point in which a focus error signal FE is zero. Thus, a waveform after the focus-on point, i.e., if the focus search succeeds or after a focus pull-in, is a signal for allowing the optical pickup 20 to perform the focus servo.

When carrying out the focus search, i.e., in section b, an optical disc recording apparatus and/or an optical disc reproducing apparatus extract(s) data on the optical disc 10, e.g., data on the type of a laser disc (LD), a compact disc (CD), and a digital versatile disc (DVD), or data on whether a disc exists.

However, in an event that a focus drop occurs due to an external impact when performing the focus search, a focus search apparatus performs the focus search again from the start.

Referring to FIG. 2, in a case where the focus search apparatus performs the focus search again, the focus search apparatus starts the focus search from the SSP. Thus, it takes a considerable amount of time to perform the focus search from the start. Also, in a case where the focus search is performed using a triangular wave, if the speed for the focus search increases, an objective lens (not shown) of the optical pickup 20 vibrates. If the speed of focus search decreases to prevent vibration of the optical pickup 20, performing the focus search after a focus drop requires a significant amount of time.

In general, an optical system, i.e., an optical disc recording apparatus and/or an optical disc reproducing apparatus, records or plays back data on or from an optical disc (or an optical recording medium), such as a CD, a DVD, or the like.

FIG. 3 is a schematic block diagram of a conventional optical disc reproducing apparatus. Referring to FIG. 3, an optical disc reproducing apparatus 300 includes an optical disc 310, a spindle motor 320, an optical pickup 330, a focusing servo 340, a tracking servo 350, a spindle servo 360, and a controller 370.

The optical pickup 330 irradiates a laser beam onto the optical disc 310 and outputs a data signal, a focus error signal, and a tracking error signal according to the laser beam reflected from the optical disc 310. The focusing servo 340 detects the focus error signal and drives an objective lens (not shown) of the optical pickup 330 within the range of the depth of a focus in response to the focus error signal. The tracking servo 350 detects the tracking error signal and follows a track in response to the tracking error signal.

The spindle servo 360 controls the spindle motor 320 that spins the optical disc 310. The controller 370 controls the over-all operations of the focusing servo 340, the tracking servo 350, and the spindle servo 360.

In order to stably carry out an optimum tracking servo and/or a focus servo, an optical disc reproducing apparatus performing the above-described operations has to control gain of a servo system, i.e., a tracking servo and/or a focusing servo.

Also, in light of the tendency toward compact and light optical disc reproducing devices, the servo system and an optical disc reproducing apparatus using the servo system have to be light and consume a small amount of power.

SUMMARY OF THE INVENTION

The present invention also provides an apparatus and method for controlling loop gain of a servo system including a tracking servo and/or a focusing servo used in an optical system to increase the stability of the optical system.

The present invention also provides a sine wave generator which is used in a servo system embedded in an optical system to realize an optical system that is compact and light and consumes a small amount of power.

The present invention also provides a method and apparatus capable of reducing the time required for a focus-on after a focus drop in an optical system. That is, the present invention also relates to a method of performing a focus search from a low-pass filtered signal output from a focus loop filter, if the focus search should be performed again after a focus drop, and a focus search waveform generator for performing the method. Accordingly, the present invention provides a focus search apparatus and method for performing a focus servo after moving an optical pickup to a focus-on point according to a signal output from a sine wave generator so that a stable and smooth focus search is performed.

According to an aspect of the present invention, there is provided a focus search method. A sine wave is generated in response to a focus search command. A focus search is performed using an optical pickup in response to the sine wave.

According to another aspect of the present invention, there is also provided a focus search method. A sine wave is generated. A focus search is performed using an optical pickup that ascends or descends toward or from an optical disc in response to an amplitude of the sine wave.

According to still another aspect of the present invention, there is also provided a focus search method. A focus search is performed using an optical pickup that ascends or descends toward or from an optical disc in response to an amplitude of a sine wave generated by a sine wave generator. After successfully performing the focus search, a focus servo is performed using the optical pickup.

According to yet another aspect of the present invention, there is also provided a focus search apparatus including a sine wave generator, a switch, and a driver. The sine wave generator generates a sine wave. The switch selectively outputs one of a signal output from the sine wave generator and a filtered focus error signal in response to a control signal. The driver drives an optical pickup in response to a signal output from the switch.

According to still yet another aspect of the present invention, there is also provided a focus search apparatus including a sine wave generator, a focus loop filter, a focus-on condition detector, a switch, and a driver. The sine wave generator generates a sine wave. The focus loop filter receives and filters a focus error signal, and outputs the filtered focus error signal. The focus-on condition detector receives a focus OK signal and the focus error signal, detects focus-on conditions, and outputs a control signal corresponding to the detection result. The switch selectively outputs one of a signal output from the sine wave generator and a signal output from the focus loop filter in response to the control signal. The driver drives an optical pickup in response to a signal output from the switch.

According to still yet another aspect of the present invention, there is also provided a focus search method. A plurality of command signals are received and focus-on conditions are detected. If the focus-on conditions are not satisfied, a focus search is performed using an optical pickup in response to a sine wave generated by a sine wave generator, and if the focus-on conditions are satisfied, a focus servo is performed using the optical pickup in response to at least one of the plurality of command signals.

According to still yet another aspect of the present invention, there is also provided a focus search method. A signal output from a focus loop filter is received, low-pass filtered, and output during a focus-on. A waveform for a focus search and the low-pass filtered signal are added during the focus search. Here, the focus search starts from the low-pass filtered signal.

According to still yet another aspect of the present invention, there is also provided a focus search method. An optical pickup is driven in response to a signal output from a focus loop filter during a focus-on period. If a focus drop occurs after the focus-on and a focus search is performed again, the focus search is performed from the signal output from the focus loop filter during the focus-on immediately before the focus drop occurs using the optical pickup.

According to still yet another aspect of the present invention, there is also provided a focus search method. An average value for the signal output from a focus loop filter during a focus-on is calculated. If a focus drop occurs after the focus-on and a focus search is performed again, a waveform for the focus search is generated and the waveform for the focus search and the average value are added. The focus search is performed within a predetermined focus search range based on the average value.

According to still yet another aspect of the present invention, there is also provided a focus search waveform generator including a filter, a sine wave generator, a counter, an amplifier, and an adder. The filter receives and low-pass filters an input signal, and outputs the low-pass filtered signal. The sine wave generator generates a sine wave during a focus search. The counter is connected to the sine wave generator, receives the sine wave, counts points at which a sign of the sine wave changes, and outputs the counted result. The amplifier is connected to the sine wave generator, receives the sine wave, and controls an amplitude of the sine wave in response to a signal output from the counter. The adder receives and adds the low-pass filtered signal output from the filter and a signal output from the amplifier, and outputs the addition result.

According to still yet another aspect of the present invention, there is also provided a focus search waveform generator including a filter, a level adjustor, a subtractor, an adder, a first amplifier, a second amplifier, a level range storage, a waveform generator, and a counter. The filter receives and filters an input signal, and outputs the low-pass filtered signal. The level adjustor outputs a predetermined level adjustment value. The subtractor receives the low-pass filtered signal output from the filter and the level adjustment value and subtracts the level adjustment value from the low-pass filtered signal output from the filter. The adder receives and adds the low-pass filtered signal output from the filter and the level adjustment value. The first amplifier is connected to the subtractor and controls a gain of a signal output from the subtractor in response to a count signal. The second amplifier is connected to the adder and controls a gain of a signal output from the adder in response to the count signal. The level range storage receives and stores signals output from the first and second amplifiers. The waveform generator generates a triangle wave swinging within a range of a signal output from the level range storage. The counter receives and compares a signal output from the waveform generator and the signal output from the level range storage, and outputs the count signal corresponding to the comparison result. Here, the signal output from the waveform generator starts from the low-pass filtered signal output from the filter.

According to still yet another aspect of the present invention, there is also provided a focus search method. A focus OK signal is received and a logic state of the focus OK signal is determined. Waveforms for a focus search having different slopes are generated based on the determination result.

According to still yet another aspect of the present invention, there is also provided a focus search method. A focus OK signal is received. If the focus OK signal is logic "low", a waveform for the focus search having a first slope is generated, and if the focus OK signal is logic "high", a waveform having a second slope is generated.

According to still yet another aspect of the present invention, there is also provided a controller for controlling a loop gain of a servo system. The controller includes a sine wave generator, a first adder, a loop filter, a second adder, a filter, and a phase difference detector. The sine wave generator generates a sine wave. The first adder receives and adds an error signal and the sine wave, and outputs the addition result. The loop filter receives a signal output from the first adder, controls a gain of the signal output from the first adder, and outputs a signal, a gain of which is controlled. The second adder receives and adds the error signal and the signal output from the first adder, and outputs the addition result. The filter receives and filters a signal output from the second adder. The phase difference detector receives the sine wave and a signal output from the filter, compares a phase difference between the sine wave and the signal output from the filter with a reference phase, and outputs a gain control signal corresponding to the comparison result. Here, the gain of the loop filter is controlled in response to the gain control signal.

According to still yet another aspect of the present invention, there is also provided a sine wave generator for generating a sine wave to control a loop gain of a servo system. The sine wave generator includes a first multiplier, a second multiplier, a first adder, a second adder, a first delay unit, a second delay unit, and a third multiplier. The first multiplier has a first factor. The second multiplier has a second factor. The first adder receives and adds a signal output from the first multiplier and a signal output from the second multiplier. The second adder receives and adds a control signal and a signal output from the first adder. The first delay unit is connected between an output node of the second adder and an input node of the first multiplier, receives a signal output from the second adder, and delays the signal output from the second adder for a predetermined period of time. The second delay unit is connected between the input node of the first multiplier and an input node of the second multiplier, receives an input signal of the first multiplier, and delays the input signal of the first multiplier for a predetermined period of time. The third multiplier has a third factor, receives the signal output from the second adder, and outputs the sine wave.

According to still yet another aspect of the present invention, there is also provided a method of controlling a gain of a servo system. An error signal and a sine wave output from a sine wave generator are received and added, and the addition result is output as a first signal. The first signal is received, a gain of the first signal is controlled, and a signal is output, a gain of which is controlled. The error signal and the first signal are received and added, and the addition result is output as a second signal. The second signal is received and filtered, and the filtered result is output as a third signal. The sine wave and the third signal are received, a phase difference between the sine wave and the third signal is compared with a reference phase, and the comparison result as a gain control signal is output. Here, the gain of the first signal is controlled in response to the gain control signal.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 4:
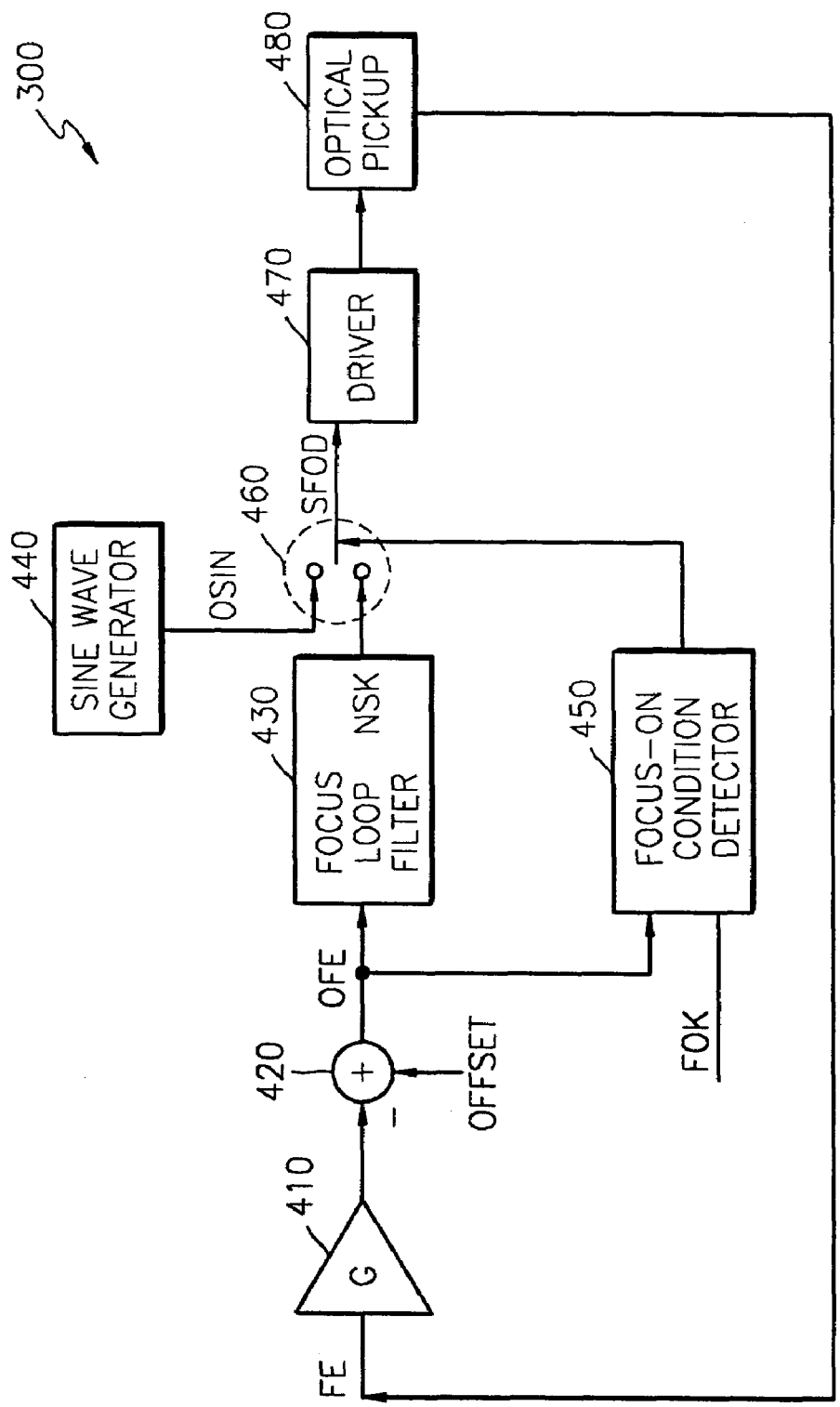
FIG. 4 is a schematic block diagram of a focus search apparatus according to the present invention.

FIG. 4 is a block diagram of a focus search apparatus according to the present invention. Referring to FIG. 4, a focus search apparatus 400 includes an amplifier 410, an adder 420, a focus loop filter 430, a sine wave generator 440, a focus-on condition detector 450, a switch 460, a driver 470, and an optical pickup 480.

The amplifier 410 receives and amplifies a focus error signal FE output from the optical pickup 480, and then outputs the amplified focus error signal to the adder 420. The adder 420 adds or subtracts an offset signal OFFSET to or from the output signal of the amplifier 410 and outputs a signal OFE to the focus loop filter 430 and the focus-on condition detector 450. Here, the offset signal OFFSET is used to remove an offset contained in the focus error signal FE.

The focus loop filter 430 receives and filters the signal OFE output from the adder 420 and then outputs a filtered signal to the switch 460. The focus loop filter 430 may be a low-pass filter (LPF) and a gain NSK thereof may be controlled by an external apparatus.

The sine wave generator 440 generates a sine wave OSIN and outputs the sine wave OSIN to the switch 460. When performing a focus search, the focus-on condition detector 450 receives a focus OK signal FOK and the signal OFE output from the adder 420, detects predetermined focus-on conditions, and outputs the detection result as a control signal to the switch 460.

The switch 460 selectively outputs the sine wave OSIN output from the sine wave generator 440 or the signal output from the focus loop filter 430 to the driver 470 in response to the control signal output from the focus-on condition detector 450.

The driver 470 receives a signal SFOD transmitted from the switch 460 and outputs a signal for a focus search or a focus servo to an actuator (not shown) of the optical pickup 480. The optical pickup 480 outputs the focus error signal FE, ascending or descending toward or from an optical disc in response to the signal output from the driver 470, i.e., performing the focus search.

Figure 5:
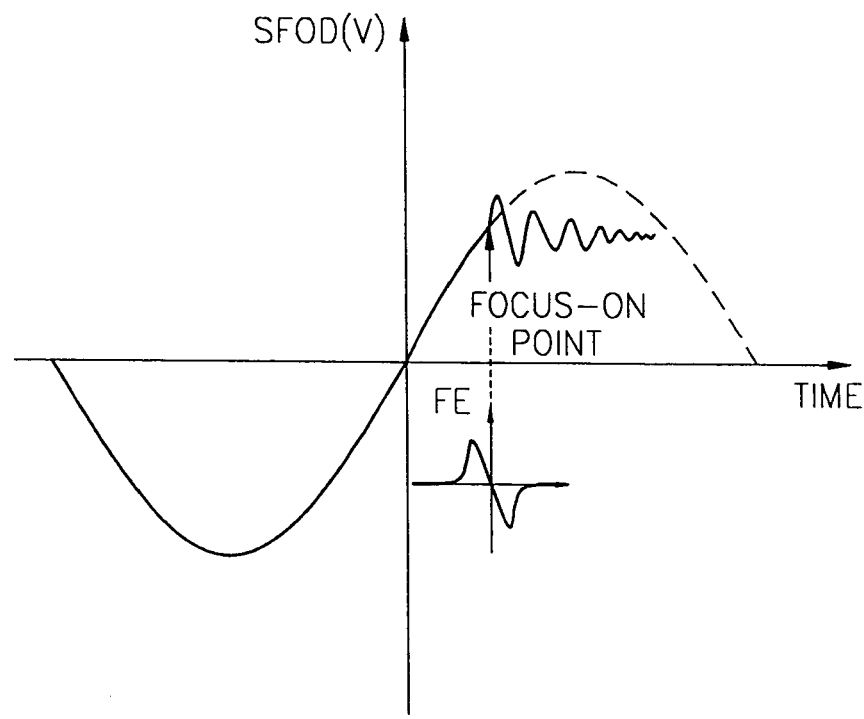
FIG. 5 illustrates a waveform of a search signal for performing a focus search using a focus search apparatus and method according to the present invention.

FIG. 5 shows a waveform of a signal for performing a focus search using a focus search apparatus and method according to the present invention. That is, FIG. 5 shows a signal output from the switch 460.

Referring to FIGS. 4 and 5, the focus search apparatus 400 according to the present invention performs the focus search in response to the amplitude of the sine wave OSIN, a signal output from the sine wave generator 440.

When performing the focus search, the switch 460 transmits the signal OSIN output from the sine wave generator 440 to the driver 470 in response to the control signal output from the focus-on condition detector 450.

After the focus search has been successfully performed, the switch 460 transmits a signal output from the focus loop filter to the driver 470. At a focus-on point or if the focus search succeeds, the focus error signal FE output from the optical pickup 480 is zero. Thus, after the focus search has been successfully performed, the optical pickup 480 performs the focus search to record or play back a signal on or from the optical disc.

Accordingly, the optical pickup 480 is driven in response to the signal OSIN output from the sine wave generator 440 when performing the focus search, and in response to the signal output from the focus loop filter 430 after the focus search succeeds.

Figure 6:
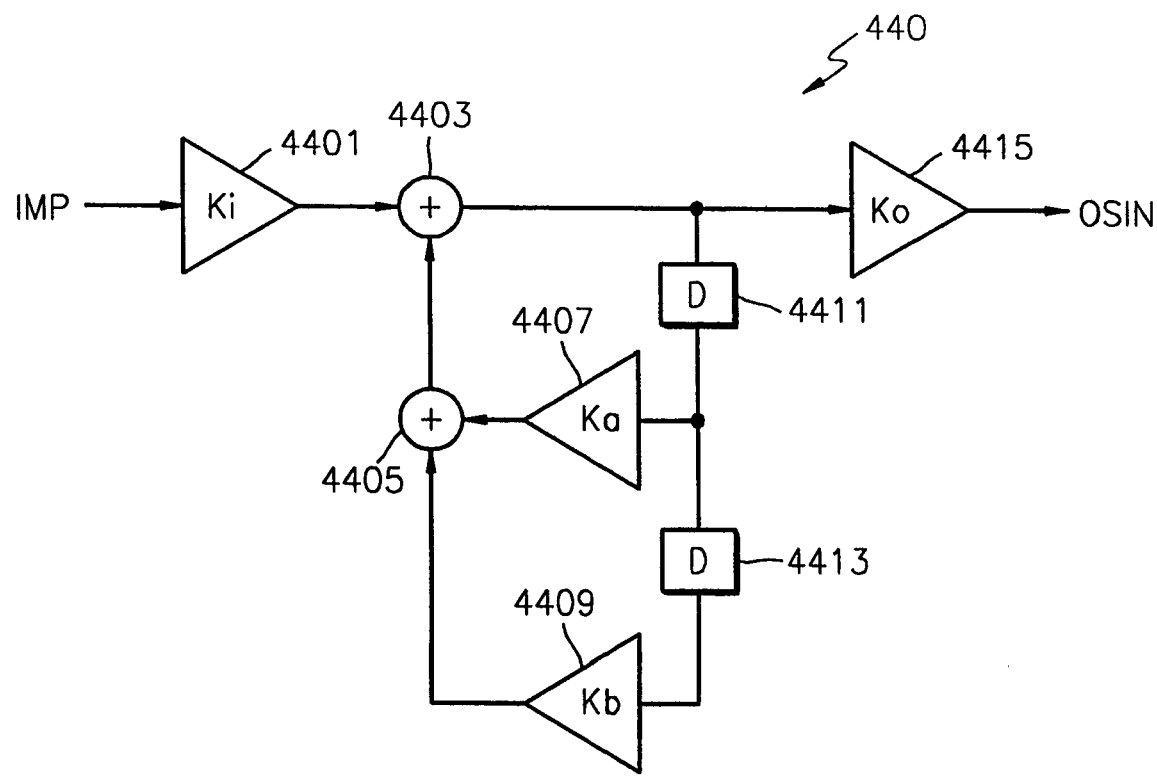
FIG. 6 is a schematic block diagram of a sine wave generator shown in FIG. 4.

FIG. 6 is a block diagram of the sine wave generator 440 shown in FIG. 4. As shown in FIG. 6, the sine wave generator 440 includes a plurality of multipliers 4401, 4407, 4409, and 4415, a plurality of adders 4403 and 4405, and a plurality of delay units 4411 and 4413. Here, Ki, Ka, Kb, and Ko denote gains or scale factors. The plurality of delay units 4411 and 4413 may be D flip-flops. The sine wave generator 440 generates the sine wave OSIN in response to an impulse signal IMP. The amplitude or frequency of the sine wave OSIN may vary.

The multiplier 4401 receives the impulse signal IMP, multiplies the impulse signal IMP by a predetermined scale factor Ki, and transmits the outputs of the multiplication result to the adder 4403. The adder 4403 adds the signal output from the multiplier 4401 and a signal output from the adder 4405 and transmits the outputs of the addition result to the multiplier 4415 and the delay unit 4411. The multiplier 4415 receives the signal output from the adder 4403, multiplies the signal by a predetermined gain Ko, and outputs the sine wave OSIN generated based on the multiplication result to the switch 460 shown in FIG. 4.

The delay unit 4411 receives the signal output from the adder 4403, delays the signal for a predetermined period of time, and outputs the delayed signal to the adder 4407 and the delay unit 4413. The delay unit 4413 receives the signal output from the delay unit 4411, delays the signal for a predetermined period of time, and outputs the delayed signal to the multiplier 4409. The multiplier 4407 multiplies the signal output from the delay unit 4411 by a predetermined constant Ka and inputs the multiplication result to the adder 4405. The multiplier 4409 multiplies the signal output from the delay unit 4413 by a predetermined constant Kb and outputs the multiplication result to the adder 4405.

The theoretical background of the sine wave generator 440 shown in FIG. 6 will be described.

First, a general z transform equation for a second order infinite impulse response (IIR) filter is given by Equation 1.

$$H(z) = \frac{Y(z)}{X(z)} = \frac{(b_0 + b_1 z^{-1} + b_2 z^{-2})}{(1 - a_1 z^{-1} - a_2 z^{-2})} \quad (1)$$

wherein, the denominator polynomial expression X(z) has two roots, which are poles of the second order IIR filter. If the poles of H(z) are complex numbers, they are represented in polar coordinates by Equation 2.

$$P_1 = re^{j\theta}$$

$$P_2 = re^{-j\theta} = P_1^* \quad (2)$$

Thus, the denominator polynomial expression X(z) is represented in a polar coordinate (r and θ) by Equation 3.

$$X(z) = (1 - P_1 z^{-1})(1 - P_2 z^{-1}) \quad (3)$$
$$= (1 - re^{j\theta} z^{-1})(1 - re^{-j\theta} z^{-1})$$
$$= 1 - (re^{j\theta} + re^{-j\theta})z^{-1} + r^2 z^{-2}$$
$$= 1 - (2r\cos\theta)z^{-1} + r^2 z^{-2}$$

Equation 1 is transformed into Equation 4 using Equation 1.

$$H(z) = \frac{Y(z)}{X(z)} = \frac{(b_0 + b_1 z^{-1} + b_2 z^{-2})}{(1 - a_1 z^{-1} - a_2 z^{-2})} \quad (4)$$
$$= \frac{(b_0 + b_1 z^{-1} + b_2 z^{-2})}{(1 - re^{j\theta} z^{-1})(1 - re^{-j\theta} z^{-1})}$$
$$= \frac{(b_0 + b_1 z^{-1} + b_2 z^{-2})}{(1 - 2r\cos\theta z^{-1} + r^2 z^{-2})}$$

wherein, two feedback factors are represented by Equation 5.

$$a_1 = 2r \cos \theta$$

$$a_2 = r^2 \quad (5)$$

A difference equation corresponding to Equation 1 is given by Equation 6.

$$y(n) = (2r \cos \theta)y[n-1] - r^2 y[n-2] + b_0 x[n] + b_1 x[n-1] + b_2[n-2] \quad (6)$$

Equations 1 through 6 express the relationship between the poles and feedback factors of the sine wave generator. For example, only a factor $a_1$ is transformed to change angles of poles. However, Equation 5 is effective only when two poles are conjugate complex numbers.

In order to obtain a continuous sine wave, poles of the sine wave generator 440 represented by Equation 1 have to be on the unit circle in the z plane. That is, r has to be 1. The angles between the poles accurately coincide with a radian frequency of the sine wave. Thus, in Equation 5, $a_2$ may be fixed to $-1$ and $a_1$ may be properly adjusted to control a frequency of the sine wave generator 440.

For example, the frequency of the sine wave OSIN generated by the sine wave generator 440 shown in FIG. 6 is adjusted by the constant Ka and the amplitude of the sine wave OSIN is adjusted by the gain Ko. Here, Ka=2 cos θ=2 cos(2π(ft/fs)) where ft denotes a target frequency and fs denotes a sampling frequency. Thus, the predetermined constant Ka may vary.

Figure 7:
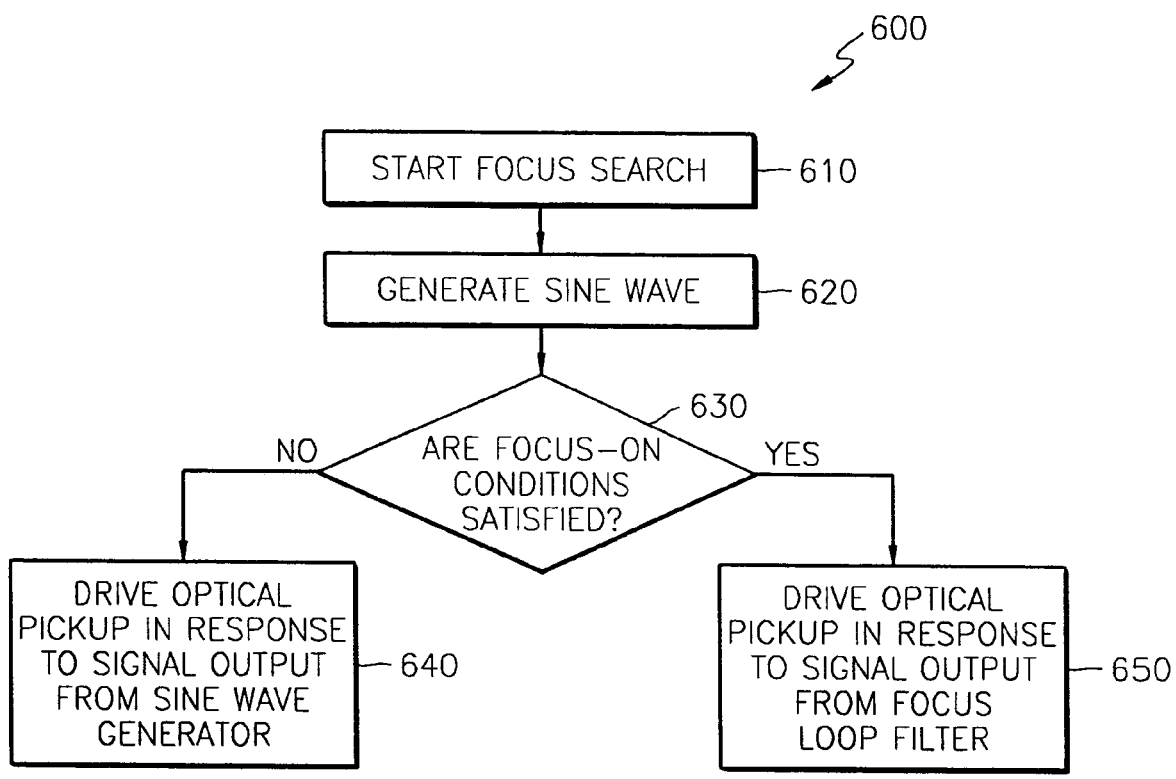
FIG. 7 is a flowchart illustrating a process of performing a focus search using a focus search apparatus and method according to the present invention.

FIG. 7 is a flowchart illustrating a process of performing a focus search using a focus search apparatus and method according to the present invention. Referring to FIGS. 4 and 7, in step 610, the focus search apparatus 400 starts the focus search according to a focus search command. In step 620, the sine wave generator 440 generates the sine wave OSIN and outputs the sine wave OSIN to the switch 460. In step 630, the focus-on condition detector 450 receives the focus error signal FE and the focus OK signal FOK, detects predetermined focus-on conditions, and outputs the control signal corresponding to the detection result to the switch 460. That is, if the focus search apparatus 400 does not satisfy the focus-on conditions, i.e., the focus search apparatus 400 does not succeed in performing the focus search, the switch 460 transmits the sine wave OSIN output from the sine wave generator 440 to the driver 470 in response to the control signal output from the focus-on condition detector 450. Thus, in step 640, the driver 470 performs the focus search, driving the optical pickup 480 in response to the sine wave OSIN output from the sine wave generator 440.

However, if the focus-on condition detector 450 detects the focus-on point as the result of the focus search, the switch 460 transmits the signal output from the focus loop filter 430 to the driver 470 in response to the control signal output from the focus-on condition detector 450. Thus, in step 650, the driver 470 performs a focus servo, driving the optical pickup 480 in response to the signal output from the focus loop filter 430.

As described above, in a focus search apparatus and method according to the present invention, a sine wave is used. Thus, a stable and smooth focus search can be carried out.

Figure 8:
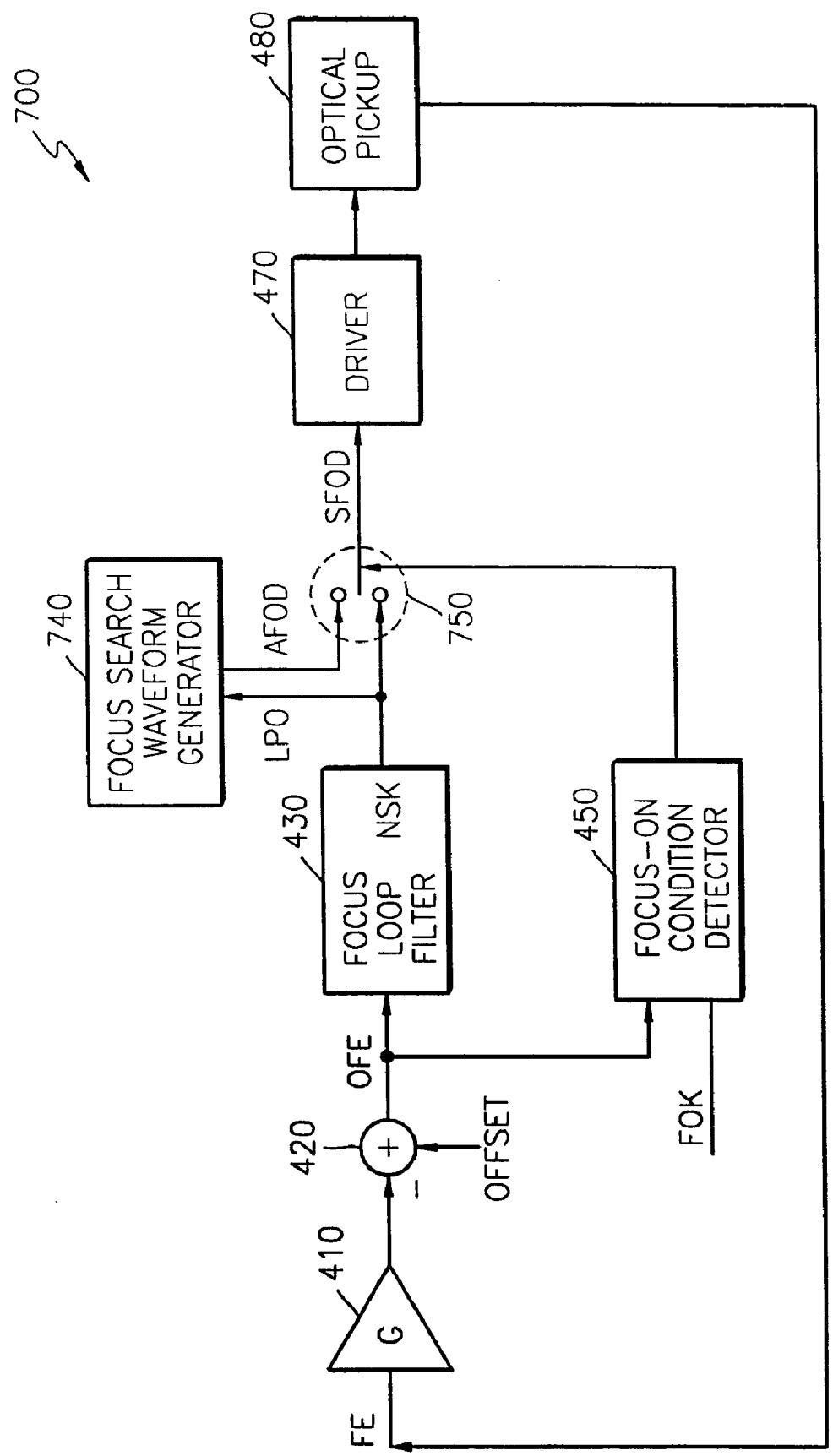
FIG. 8 is a schematic block diagram of a focus search apparatus having a focus search waveform generating circuit according to an embodiment of the present invention.

FIG. 8 is a block diagram of a focus search apparatus 700 having a focus search waveform generator 740 according to an embodiment of the present invention. Referring to FIG. 8, the focus search apparatus 700 used in an optical system includes an amplifier 410, an adder 420, a focus loop filter 430, a focus search waveform generator 740, a focus-on condition detector 450, a switch 750, a driver 470, and an optical pickup 480.

The amplifier 410 receives and amplifies a focus error signal FE output from the optical pickup 480, and then outputs the amplification result to the adder 420. Here, G denotes a gain of the amplifier 410, which may be controlled.

The adder 420 adds or subtracts an offset signal OFFSET to or from a signal output from the amplifier 410, and outputs a signal OFE, an offset of which is adjusted, to the focus loop filter 430 and the focus-on detector 450.

The focus loop filter 430 receives and filters the result OFE output from the adder 420, and outputs a signal LPO to the switch 750 and the focus search waveform generator 740.

The focus search waveform generator 740 receives the signal LPO output from the focus loop filter 430, low-pass filters the signal LPO during a focus-on, obtains an average value of the low-pass filtered signal, i.e., the signal LPO output from the focus loop filter 430, and outputs a signal AFOD, which is an addition of the average value to a sine wave having a predetermined amplitude, to the switch 750 when performing the focus search. Thus, after a focus drop, the start point of the focus search is a focus-on point before the focus drop occurs.

When performing the focus search, the focus-on condition detector 450 receives a focus OK signal FOK and the signal OFE output from the adder 420, detects predetermined focus-on conditions, and outputs a control signal corresponding to the detection result to the switch 750.

In general, the focus-on conditions refer to a case where a focus zero cross signal FZC transits from a logic "high" state to a logic "low" state when the focus OK signal FOK is logic high.

Also, if the speed of the focus search is controlled at the focus-on point, a focus pull-in rate increases. That is, if the speed of the focus search when the focus OK signal FOK is logic "low" is faster than the speed of the focus search when the focus OK signal FOK is logic "high", the focus pull-in rate may increase.

Figure 1:
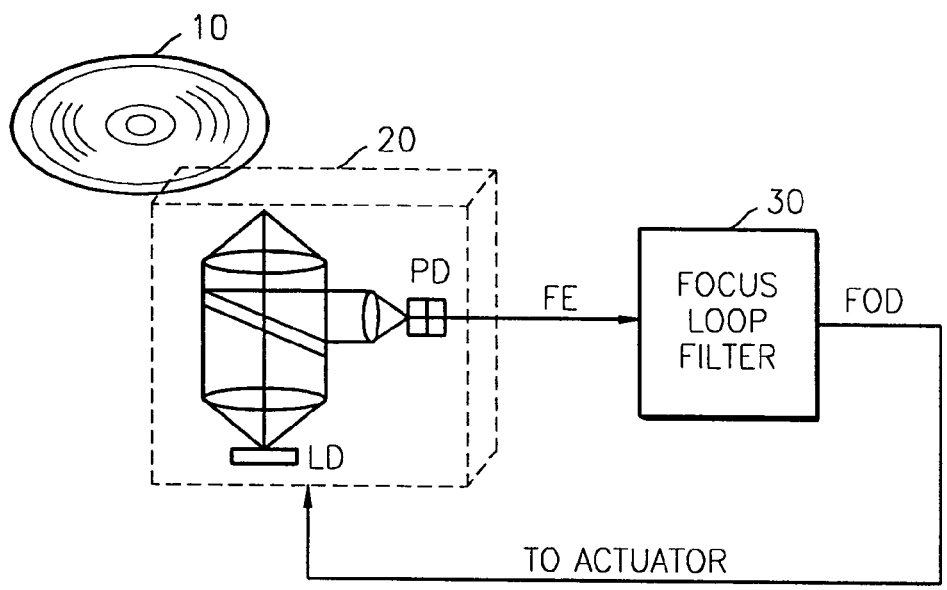
FIG. 1 is a schematic block diagram illustrating a focus servo in a general optical system.
Figure 2:
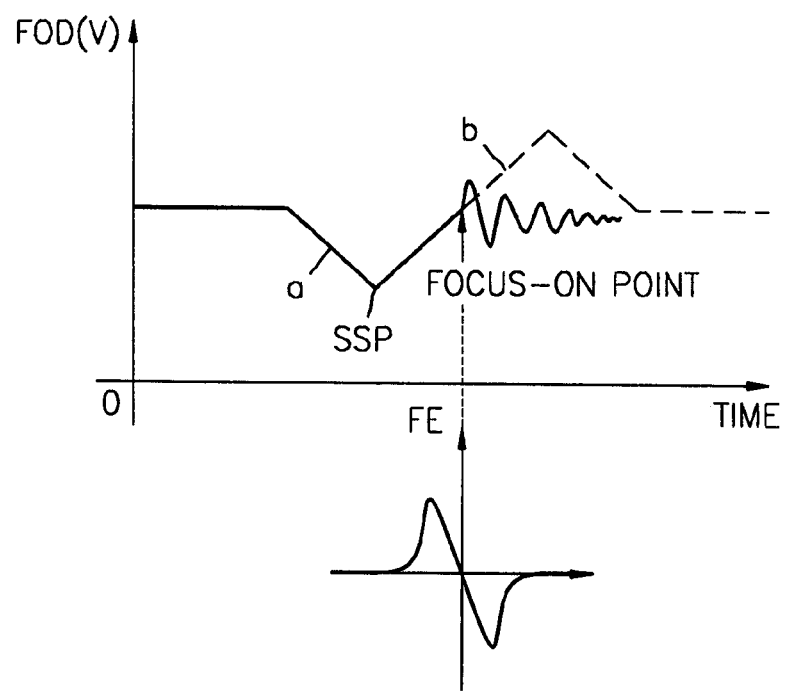
FIG. 2 illustrates a waveform of a signal output from a focus loop filter shown in FIG. 1.
Figure 3:
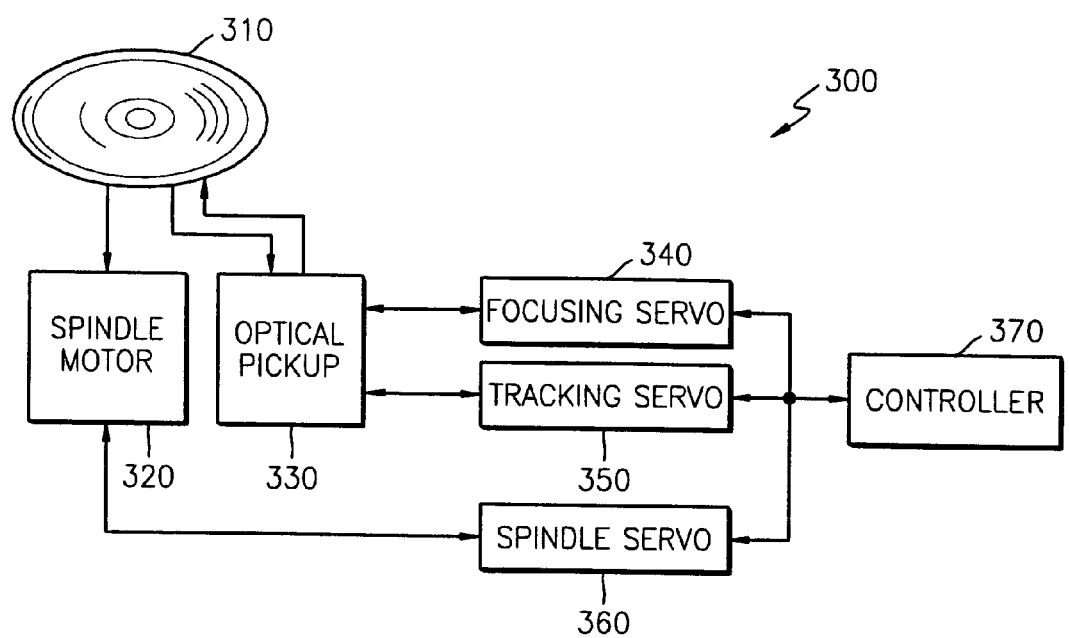
FIG. 3 is a schematic block diagram of a conventional optical disc reproducing apparatus.

Referring to FIGS. 1 and 8, the speed for driving the optical pickup 20 when the focus OK signal FOK is logic "low" is faster than the speed for driving the optical pickup 20 when the focus OK signal FOK is logic "high". The slope of a waveform for performing the focus search when the focus OK signal FOK is logic "low" is greater than the slope of a waveform for performing the focus search when the focus OK signal FOK is logic "high".

The switch 750 selectively outputs the signal AFOD output from the focus search waveform generator 740 or the signal LPO output from the focus loop filter 430 in response to the signal output from the focus-on condition detector 450.

The switch 750 may be a multiplexer, and when performing the focus search, transmits the signal AFOD output from the focus search waveform generator 740 to the driver 470 in response to the signal output from the focus-on condition detector 450. After the focus-on, the switch 750 also outputs the signal LPO output from the focus loop filter 430 in response to the signal output from the focus-on condition detector 450.

The driver 470 receives a signal SFOD transmitted from the switch 750 and outputs a signal for performing the focus search or a focus servo to an actuator (not shown) of the optical pickup 480. The optical pickup 480 outputs the focus error signal FE, ascending or descending toward or from an optical disc, i.e., performing the focus search, in response to the signal output from the driver 470.

Figure 9:
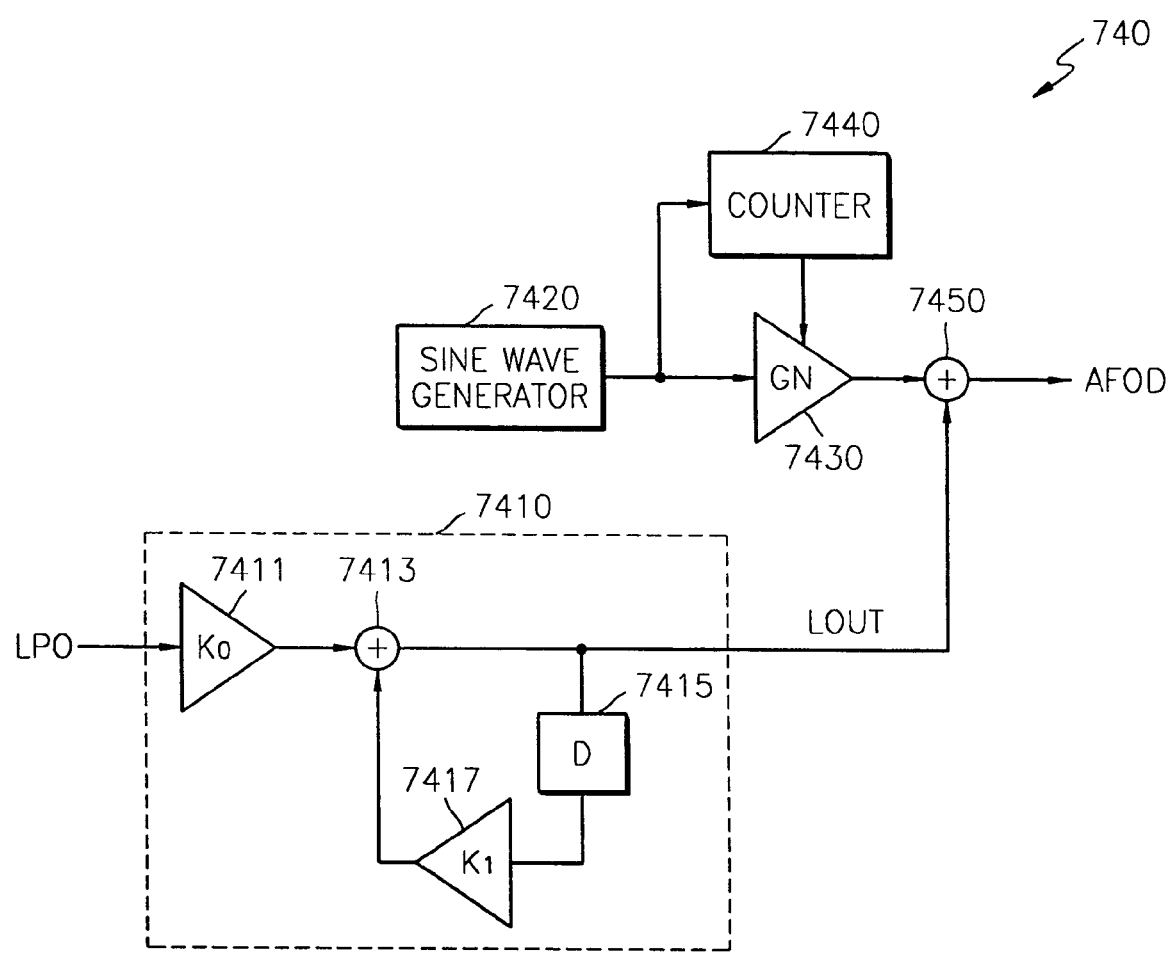
FIG. 9 is a schematic block diagram of the focus search waveform generating circuit shown in FIG. 8.

FIG. 9 is a block diagram of the focus search waveform generator 740 shown in FIG. 8. Referring to FIG. 9, the focus search waveform generator 740 includes a filter 7410, a sine wave generator 7420, an amplifier 7430, a counter 7440, and an adder 7450.

The filter 7410 receives and filters the signal LPO output from the focus loop filter 430, and outputs a filtered signal LOUT to the adder 7450. The filter 7410 is a low-pass filter, which obtains an average value LOUT for the signal LPO output from the focus loop filter 430 during the focus-on.

Accordingly, during the focus-on, the filter 7410 calculates the average value LOUT by integrating the signal LPO output from the focus loop filter 430, and during the focus search, holds the average value LOUT. Thus, after the focus search succeeds, a focus drop occurs, and if the focus search restarts, the signal output from the filter 7410 becomes the start point of the focus search.

Therefore, since a focus search apparatus restarts a focus search from a point right before a focus drop occurs, the focus search apparatus can rapidly search for a focus-on point even though the range of the focus search is narrow. Thus, the focus search apparatus can rapidly restore a focus.

The filter 7410 includes a first amplifier 7411, an adder 7413, a delay unit 7415, and a second amplifier 7417. A gain of the first amplifier 7411 is Ko and a gain of the second amplifier 7417 is K1. The first amplifier 7411 receives and amplifies the signal LPO output from the focus loop filter 430, and outputs the amplification result to the adder 7413.

The adder 7413 receives and adds the signal output from the first amplifier 7411 and a signal output from the second amplifier 7417, and outputs the addition result to the delay unit 7415 and the adder 7450. The delay unit 7415 receives the signal LOUT output from the adder 7413, delays the signal LOUT for a predetermined period of time, and outputs the delayed signal to the second amplifier 7417. The delay unit 7415 may be a D flip-flop.

Only during the focus search, the sine wave generator 7420 generates a sine wave having predetermined amplitude and frequency in response to a predetermined impulse signal and outputs the sine wave to the amplifier 7430 and the counter 7440. Here, the sine wave pull-swings.

The counter 7440 counts the number of times the focus search is performed and outputs the counted result to the amplifier 7430. Here, the number of times the focus search is performed may be preset or controlled by an external apparatus.

A gain GN of the amplifier 7430 is controlled in response to a signal output from the counter 7440. It is preferable that the gain GN of the amplifier 7430 be generally less than 1 and increases in proportion to the number of times the focus search is performed. Thus, the gain GN of the amplifier 7430 determines the amplitude of the sine wave.

During the focus search, the adder 7450 receives and adds a signal output LOUT from the filter 7410 and the signal output from the amplifier 7430 and outputs a signal AFOD to the switch 750.

Figure 10:
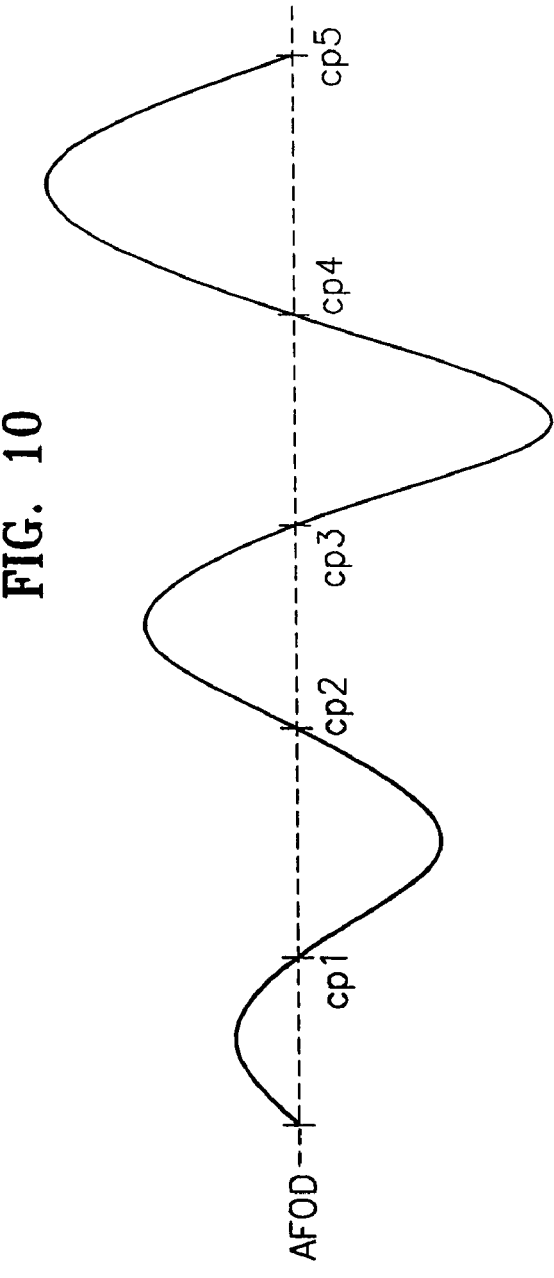
FIG. 10 illustrates a waveform of a signal output from the focus search waveform generating circuit shown in FIG. 9.

FIG. 10 shows a waveform of a signal output from the focus search waveform generator 740. Referring to FIGS. 9 and 10, the counter 7440 counts the number of points CP1, CP2, CP3, CP4, and CP5 at which the sign of the sine wave changes during the focus search. The number of points counted by the counter 7440 may be determined by an external controller (not shown).

In a case where the focus search is not successfully performed within the range of the focus search, the range of the focus search, i.e., the amplitude of the sine wave, gradually increases.

Figure 11:
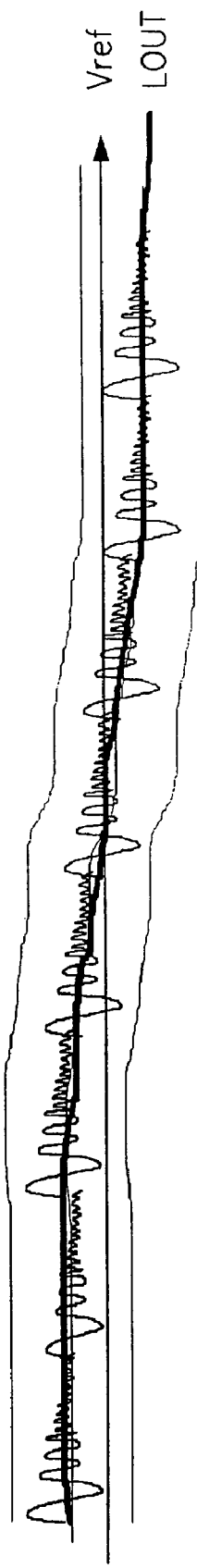
FIG. 11 illustrates a waveform of a signal output from a switch shown in FIG. 8.

FIG. 11 shows a waveform of a signal output from the switch 750 shown in FIG. 8. A case in which the focus search restarts since a focus drop occurs after a focus search succeeds will be described in detail with reference to FIGS. 8 through 11.

The number of times the focus search is performed is set in the counter 7440. The number of times the focus search is performed may be set by a user or may be set to a default value by a manufacturing company of the focus search apparatus 700.

If the focus search succeeds, the optical pickup 480 is driven in response to a signal output from the focus loop filter 430. That is, the focus search waveform generator 740 receives and low-pass filters the signal LPO output from the focus loop filter 430, and outputs the signal AFOD to the switch 750. Thus, the optical pickup 480 is substantially driven in response to the signal AFOD.

However, if the focus drop occurs, the focus search apparatus 700 performs the focus search again. Thus, the switch 750 transmits the signal AFOD output from the focus search waveform generator 740 to the driver 470 in response to the signal output from the focus-on condition detector 450.

During the focus search, the sine wave generator 7420 generates the sine wave and outputs the sine wave to the counter 7440 and the amplifier 7430 in response to a predetermined impulse signal. The amplifier 7430 controls the amplitude of the sine wave output from the sine wave generator 7420 in response to a signal output from the counter 7440.

The counter 7440 receives the sine wave output from the sine wave generator 7420, counts the number of points at which the sign of the sine wave changes, and outputs the counted number of points to the amplifier 7430. The amplifier 7430 increases the gain GN in response to the signal output from the counter 7440.

For example, if the focus search is not successfully performed until point CP1, the focus search is performed between points CP1 and CP2. If the focus search is successfully performed within the range between the point CP1 and the point CP2, the focus search waveform generator 740 receives and filters the signal LPO output from the focus loop filter 430, and outputs the signal AFOD to the switch 750. Here, the counter 7440 is reset. If the focus search is successfully performed, the counter 7440 is reset.

In the event that the focus drop occurs again and thus the focus search restarts, the sine wave generator 7420 generates a sine wave again, and the counter 7440 counts the number of points at which the sign of the sine wave changes and outputs the counted number of points to the amplifier 7430. The amplifier 7430 increases the gain GN in response to a signal output from the counter 7440.

The adder 7450 adds the signal LOUT output from the filter 7410 and a signal output from the amplifier 7430 and outputs the signal AFOD to the switch 750.

The driver 470 receives the signal SFOD transmitted from the switch 750 and outputs a signal for performing the focus search or a focus servo to the actuator of the optical pickup 480. The optical pickup 480 outputs the focus error signal FE, ascending or descending toward or from the optical disc, i.e., performing the focus search, in response to a signal output from the driver 470.

In this case, the focus search is performed from a point immediately before the appearance of a focus drop, i.e., from the signal LOUT output from the filter 7410.

Figure 12:
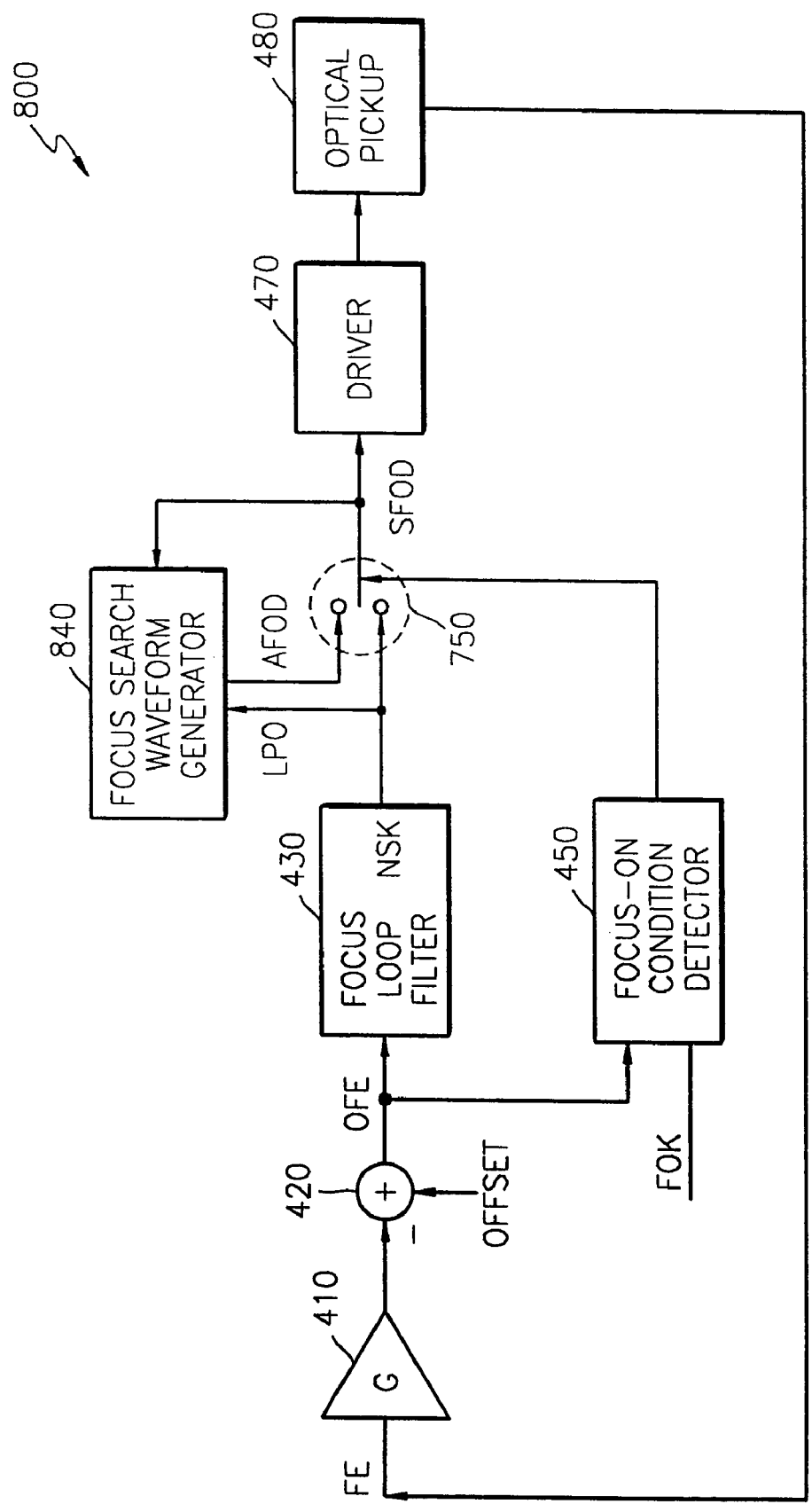
FIG. 12 is a schematic block diagram of a focus search apparatus having a focus search waveform generating circuit according to another embodiment of the present invention.

FIG. 12 is a block diagram of a focus search apparatus having a focus search waveform generator according to another embodiment of the present invention.

The structure of a focus search apparatus 800 shown in FIG. 12 is the same as the structure of the focus search apparatus 700 shown in FIG. 8 except for the structure and operation of the focus search waveform generator 840. Thus, description of like elements in the two figures will not be repeated here.

The focus search waveform generator 840 receives a signal LPO output from a focus loop filter 430 and a signal SFOD output from a switch 750. During a focus-on, the focus waveform generator 480 receives and filters the signal LPO output from the focus loop filter 430, and outputs a signal LOUT to the switch 750. If the focus search is performed after a focus drop, the focus search waveform generator 840 adds a signal output from the filter 7410 shown in FIG. 13, i.e., an average value obtained by integrating the signal LPO output from the focus loop filter 430, and a triangular wave having a predetermined range, and outputs a signal AFOD to the switch 750.

Figure 13:
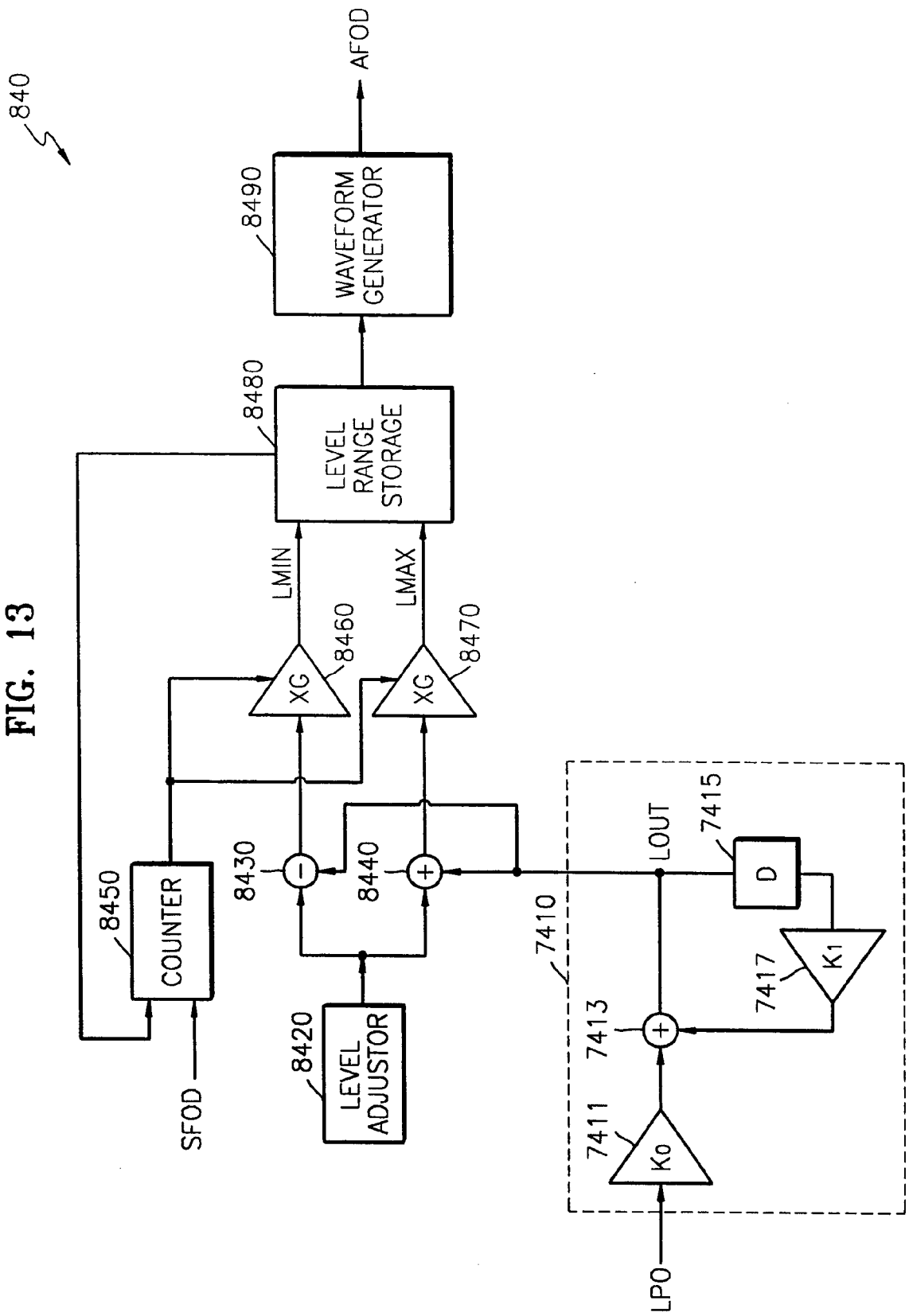
FIG. 13 is a schematic block diagram of the focus search waveform generating circuit shown in FIG. 12.

FIG. 13 is a block diagram of the focus search waveform generator 840 shown in FIG. 12. The focus search waveform generator 840 includes a filter 7410, a level adjustor 8420, a subtractor 8430, an adder 8440, a counter 8450, a first amplifier 8460, a second amplifier 8470, a level range storage 8480, and a waveform generator 8490.

The filter 7410 filters the signal LPO output from the focus loop filter 430 shown in FIG. 12 and outputs the signal LOUT to the subtractor 8430 and the adder 8440. The filter 7410 receives the signal LPO output from the focus loop filter 430, calculates the average value by integrating the signal LPO output from the focus loop filter 430, and outputs the average value LOUT to the subtractor 8430 and the adder 8440 during the focus search. The structure of the filter 7410 shown in FIG. 8 is the same as that of the filter 7410 shown in FIG. 9.

The level adjustor 8420, which adjusts the range of the focus search during the focus search, outputs a predetermined value to the subtractor 8430 and the adder 8440, the value of which may be controlled.

The subtractor 8430 receives the signal LOUT output from the filter 7410 and a signal output from the level adjustor 8420, subtracts the signal output from the level adjustor 8420 from the signal LOUT output from the filter 7410, and outputs the subtraction result to the first amplifier 8460. That is, the subtractor 8430 calculates the lowest limit of the range of the focus search.

The adder 8440 receives and adds the signal LOUT output from the filter 7410 and the signal output from the level adjustor 8420, and outputs the addition result to the second amplifier 8470. That is, adder 8470 calculates the upper limit of the range of the focus search.

The first amplifier 8460 controls a gain XG of the signal output from the subtractor 8430 and outputs a signal LMIN, a gain of which has been controlled, to the level range storage 8480 in response to a signal output from the counter 8450. The second amplifier 8470 controls a gain XG of the signal output from the adder 8470 in response to the signal output from the counter 8450 and outputs a signal LMAX, a gain of which has been controlled, to the level range storage 8480.

The level range storage 8480 stores the signals LMIN and LMAX output from the first and second amplifiers 8460 and 8470 and outputs the signals LMIN and LMAX to the counter 8450 and the waveform generator 8490.

The counter 8450 receives and compares the signal SFOD output from the switch 750 shown in FIG. 12 and the signals LMIN and LMAX output from the level range storage 8480 and outputs a signal corresponding to the comparison result to the first and second amplifiers 8460 and 8470.

That is, the counter 8450 compares the upper limit LMAX output from the level range storage 8480 with the upper limit of the signal SFOD output from the switch 750 or compares the lowest limit LMIN output from the level range storage 8480 with the lowest limit of the signal SFOD output from the switch 750. If the upper limit LMAX is identical to the upper limit of the signal SFOD or the lowest limit LMIN is identical to the lowest limit of the signal SFOD, the counter 8450 outputs an up-counted value.

Accordingly, gains of the first and second amplifiers 8460 and 8470 increase in response to a signal output from the counter 8450.

The waveform generator 8490 generates a triangular wave AFOD, which swings within the range and the upper limit LMAX and the lowest limit LMIN stored in the level range storage 8480, and outputs the triangular wave AFOD to the switch 750.

Figure 14:
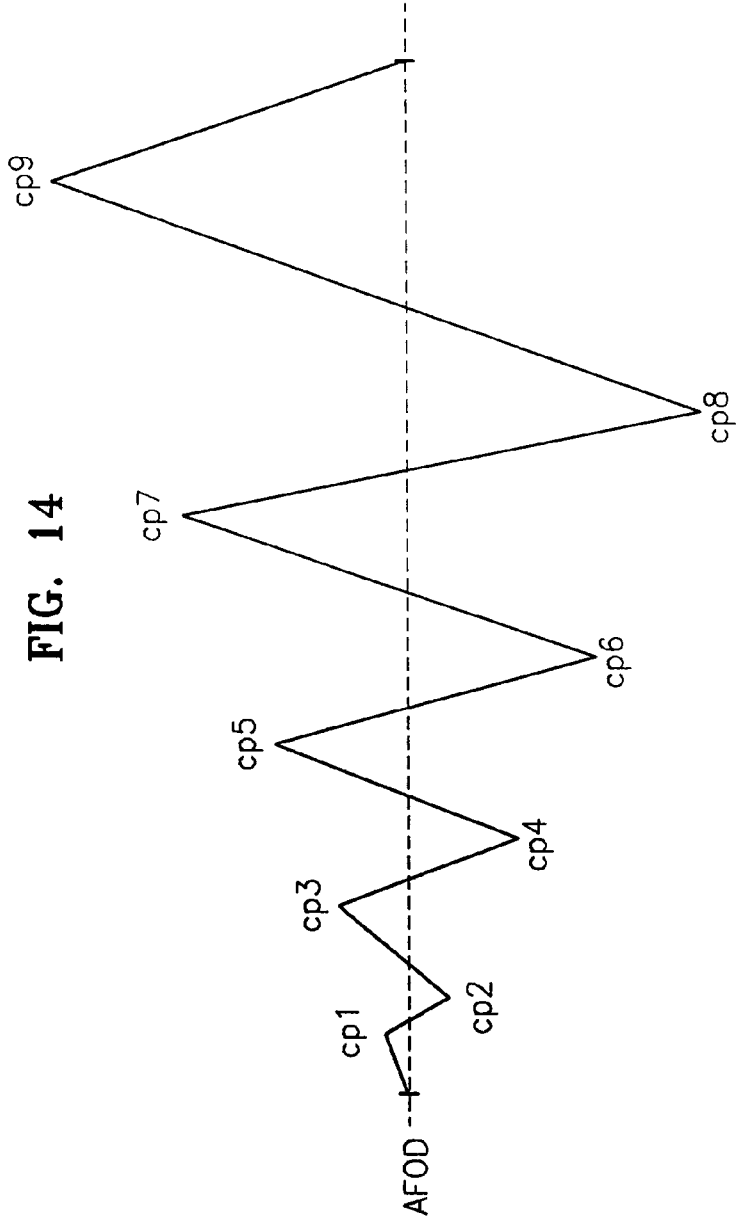
FIG. 14 illustrates a waveform of a signal output from the focus search waveform generating circuit shown in FIG. 12.

FIG. 14 shows a waveform of a signal output from the focus search waveform generator 840 shown in FIG. 12. Referring to FIGS. 13 and 14, the counter 8450 counts the number of apex points CP1 through CP9 of triangular waves. That is, the apex points CP1 through CP9 of the triangular waves are count points representing the number of times a focus search is performed. If focus-on conditions are not satisfied, the range of the triangular waves gradually increases.

Figure 15:
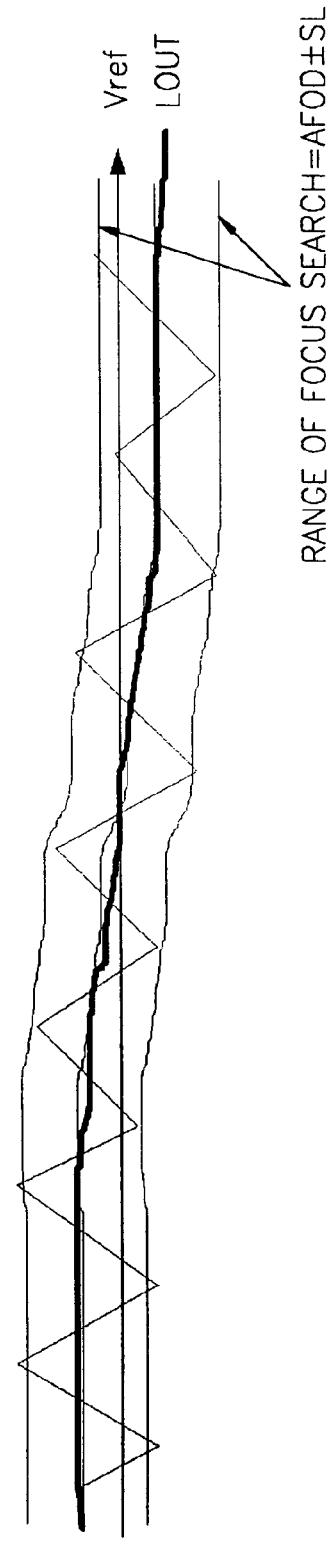
FIG. 15 illustrates a waveform of a signal output from a switch shown in FIG. 12.

FIG. 15 shows a waveform of a signal output from the switch 750 shown in FIG. 12. The operation of the focus search apparatus 800 will now be described with reference to FIGS. 12 through 15.

During a focus-on, the driver 470 receives the signal LPO output from the focus loop filter 430 and the optical pickup 480 plays back data recorded on the optical disc in response to the signal output from the driver 470.

However, if the focus search apparatus 800 performs a focus search again due to a focus drop, the focus search starts from a point right before the occurrence of a focus drop.

When performing the focus search, the subtractor 8430 subtracts the signal output from the level adjustor 8420 from the signal LOUT output from the filter 7410 and outputs the subtraction result to the first amplifier 8460. Also, the adder 8440 adds the signal LOUT output from the filter 7410 and the signal output from the level adjustor 8420 and outputs the addition result to the second amplifier 8470.

The first and second amplifiers 8460 and 8470 control the gains XG in response to the signal output from the counter 8450 and output the signals LMIN and LMAX, gains of which have been controlled, to the level range storage 8480.

The waveform generator 8490 receives the upper limit LMAX and the lowest limit LMIN from the level range storage 8480 and generates triangular waves AFOD from the signal LOUT output from the filter 7410. The triangular waves AFOD swing within the range between the upper limit LMAX and the lowest limit LMIN.

The counter 8450 receives the upper limit LMAX/the lowest limit LMIN from the level range storage 8480 and the triangular waves AFOD=SFOD generated by the waveform generator 8490 and compares the limit LMAX/the lowest limit LMIN with the upper/lowest limit of the triangular waves AFOD=SFOD. If the upper limit LMAX/lowest limit LMIN is identical to the upper limit/lowest limit of the triangular waves AFOD=SFOD, the counter 8450 increases the counted value. The apex points CP1, CP3, CP5, CP7, and CP9 shown in FIG. 14 are the upper limit LMAX and the apex points CP2, CP4, CP6, and CP8 are the lowest limit LMIN.

In a case where a focus drop occurs after the focus search is successfully performed and thus the focus search restarts, the start point of the focus search is a focus-on point right before the occurrence of a focus drop, i.e., the signal LOUT output from the filter 7410.

Accordingly, the focus search apparatus 800 can rapidly search for the focus-on point even though the range of the focus search is narrow.

Also, a focus search method according to the present invention is identically applied even if a defect signal or an anti-shock signal ATSC is generated after a focus-on. The defect signal is generated when a disc is marked with scratches, fingerprints or black dots. The defect signal is induced by a signal output from a radio frequency amplifier. Also, the anti-shock signal ATSC is to sense a shock from the outside using a tracking error signal.

As described above, in the focus search method according to the present invention, when a focus search is performed again after a focus drop, the start point of the focus search is a focus-on point right before the occurrence of a focus drop. Even though the range of the focus search is narrow, the focus-on point can be rapidly searched for.

Accordingly, a focus-on point can be rapidly searched for in a portable optical system, which is frequently shocked from the outside, using a focus search method according to the present invention. Thus, data can be restored fast.

Figure 16:
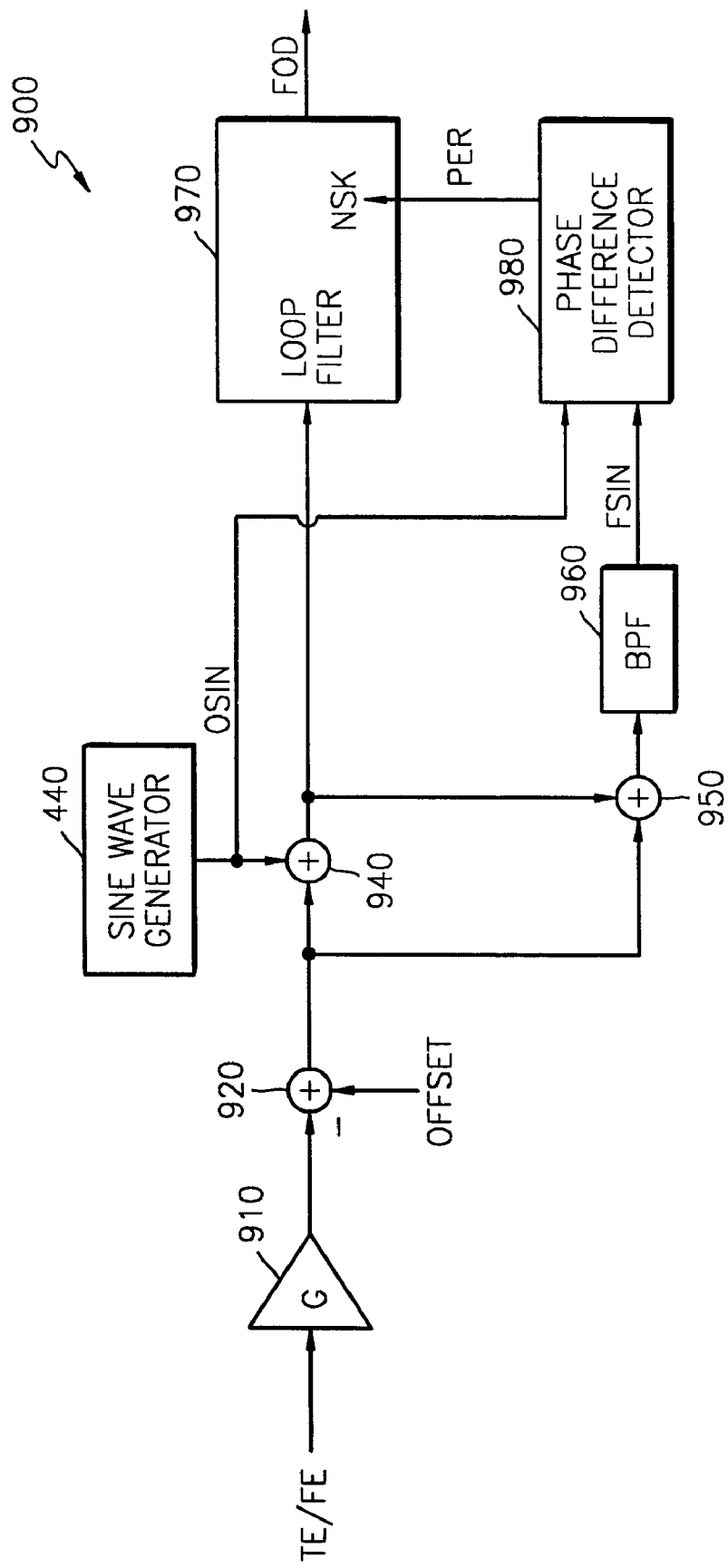
FIG. 16 is a schematic block diagram of a loop gain controller for a servo system according to an embodiment of the present invention.

FIG. 16 is a block diagram of a loop gain controller of a servo system according To an embodiment of the present invention. The loop gain controller 900 shown in FIG. 16 controls a loop gain of a tracking servo and/or a loop gain of a focusing servo in an optical system.

The loop gain controller 900 includes an amplifier (or a multiplier) 910, a plurality of adders 920, 940, and 950, a sine wave generator 440, a band pass filter (BPF) 960, a loop filter 970, and a phase difference detector 980. The structure and function of the sine wave generator 440 shown in FIG. 16 are the same as those of the sine wave generator 440 shown in FIGS. 4 and 6.

The amplifier 910 receives and amplifies a tracking error signal TE or a focus error signal FE output from an optical pickup (not shown), and outputs the amplification result to the adder 920. Here, G, a gain of the amplifier 910 or a factor of the multiplier, may be controlled by a user.

The adder 920 receives a signal output from the amplifier 910 and an offset signal OFFSET to compensate for an offset of the signal output from the amplifier 910 and outputs a tracking error signal or a focus error signal, an offset of which has been compensated for, to the adders 940 and 950. The sine wave generator 440 generates a sine wave OSIN having predetermined frequency and amplitude and outputs the sine wave OSIN to the adder 940 and the phase difference detector 980.

The adder 940 receives and adds the sine wave OSIN output from the sine wave generator 440 and the signal output from the adder 920, i.e., the tracking error signal or the focus error signal, the offset of which has been compensated for, and outputs the addition result to the adder 950 and the loop filter 970.

The loop filter 970 receives the signal output from the adder 940, controls a gain NSK of the signal output from the adder 940, and outputs a tracking error signal or a focus error signal FOD, a gain of which has been controlled, to a driver (not shown). The driver drives the optical pickup (not shown) in response to the tracking error signal or the focus error signal FOD.

The adder 950 receives and adds signals output from the adders 920 and 940, and outputs the addition result to the BPF 960. The BPF 960 receives and band-pass filters a signal output from the adder 950, and outputs a signal FSIN, which has been band-pass filtered, to the phase difference detector 980.

The phase difference detector 980 receives the signal OSIN output from the sine wave generator 440 and the signal FSIN output from the BPF 960, compares a phase difference between the signals OSIN and FSIN with a reference phase, e.g., 90° or $\pi/2$, and outputs a gain control signal PER corresponding to the comparison result to the loop filter 970.

The loop filter 970 decreases or increases a gain of a signal from the first adder 940 input to the loop filter 970 and outputs the tracking error signal or the focus error signal FOD, a gain of which has been controlled, in response to the gain control signal PER. It is preferable that the loop filter 970 be a low-pass filter.

Figure 17:
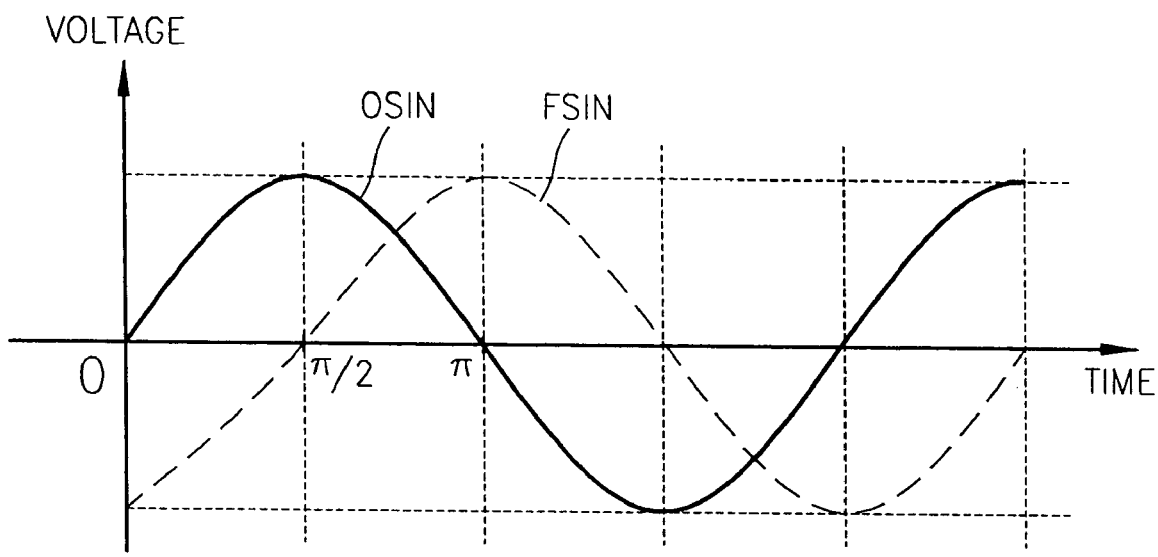
FIGS. 17 through 19 are graphs illustrating an input waveform of the loop gain controller shown in FIG. 16.
Figure 18:
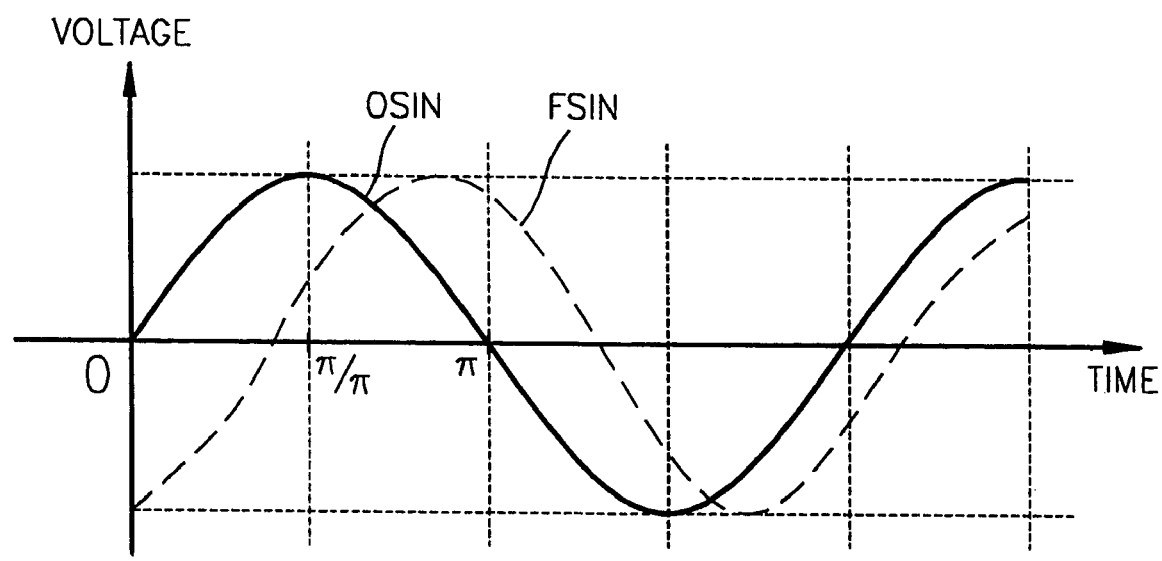
Figure 19:
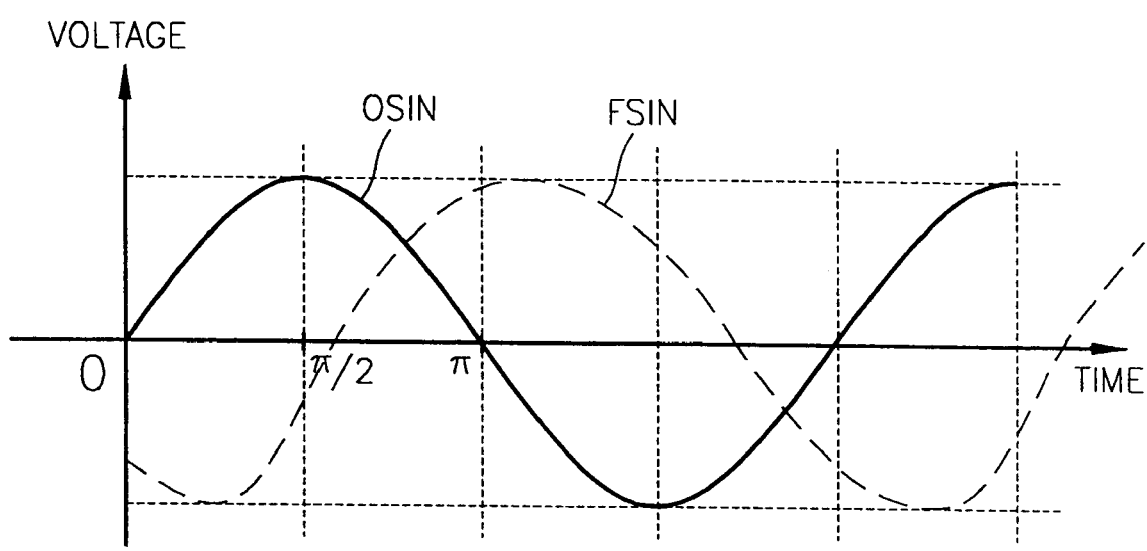

FIGS. 17 through 19 illustrate an input waveform of the loop gain controller 900 shown in FIG. 16. Referring to FIG. 16, the phase difference detector 980 receives the signal FSIN output from the BPF 960 and the signal OSIN output from the sine wave generator 930, compares the phase difference between the signals OSIN and FSIN with the reference phase, e.g., 90°, and outputs the gain control signal PER corresponding to the comparison result to the loop filter 970. Then, the loop filter 970 controls the gain NSK in response to the gain control signal PER.

For example, referring to FIGS. 16 and 17, if the phase difference between the signal FSIN output from the BPF 960 and the signal OSIN output from the sine wave generator 440 is $\pi/2$, the gain NSK of the loop filter 970 is 1, i.e., 0 dB.

Referring to FIGS. 16 and 18, if the phase difference between the signal FSIN output from the BPF 960 and the signal OSIN output from the sine wave generator 440 is less than $\pi/2$, the gain NSK of the loop filter 970 is less than 1. Thus, the loop filter 970 increases the gain NSK thereof in response to the gain control signal PER.

Referring to FIGS. 16 and 19, if the phase difference between the signal FSIN output from the BPF 960 and the signal OSIN output from the sine wave generator 440 is greater than $\pi/2$, the gain NSK of the loop filter 970 is greater than 1. Thus, the loop filter 970 decreases the gain NSK thereof in response to the gain control signal PER.

That is, the phase difference detector 980 compares the phase difference between the signal FSIN output from the BPF 960 and the signal OSIN output from the sine wave generator 440 with the reference phase for each predetermined period of time and outputs the gain control signal PER corresponding to the comparison result to the loop filter 970. Thus, the loop filter 970 automatically increases or decrease the gain thereof in response to the gain control signal PER.

Accordingly, a loop gain of a tracking servo or a focusing servo having a loop gain controller according to the present invention is automatically controlled. Thus, the stability of an optical system having the tracking servo or the focusing servo increases.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A focus search method comprising:
   calculating an average value for a signal output from a focus loop filter during a focus-on;
   if a focus drop occurs after the focus-on and a focus search is performed again, generating a sine wave in response to a focus search command for the focus search and adding the sine wave and the average value; and
   performing a focus search within a predetermined focus search range based on the average value by an optical pickup outputting a focus error signal in response to the sine wave, wherein the sine wave is generated independently of the focus error signal, and the sine wave is digitally generated automatically from an impulse signal by using a plurality of multipliers, a plurality of adders, and a plurality of delay units.

2. The focus search method of claim 1, wherein a frequency and/or an amplitude of the sine wave varies according to multiply factors of the plurality of multipliers.

3. The focus search method of claim 1, wherein after successfully performing the focus search, the optical pickup performs a focus servo.

4. A focus search method comprising:
   calculating an average value for a signal output from a focus loop filter during a focus-on;
   if a focus drop occurs after the focus-on and a focus search is performed again, generating a sine wave for the focus search and adding the sine wave and the average value; and performing a focus search within a predetermined focus search range based on the average value using an optical pickup that outputs a focus error signal and that ascends or descends toward or from an optical disc in response to an amplitude of the sine wave, wherein the sine wave is generated independently of the focus error signal, and the sine wave is digitally generated automatically from an impulse signal by using a plurality of multipliers, a plurality of adders, and a plurality of delay units.

5. The focus search method of claim 4, wherein a frequency and/or an amplitude of the sine wave varies, according to multiply factors of the plurality of multipliers.

6. The focus search method of claim 4, further comprising starting a focus servo after a focus-on point using the optical pickup.

7. A focus search method comprising:
calculating an average value for a signal output from a focus loop filter during a focus-on;
if a focus drop occurs after the focus-on and a focus search is performed again, performing a focus search within a predetermined focus search range based on the average value using an optical pickup that outputs a focus error signal and that ascends or descends toward or from an optical disc in response to an amplitude of a sine wave generated by a sine wave generator, wherein the sine wave is generated independently of the focus error signal, and the sine wave is digitally generated automatically from an impulse signal by using a plurality of multipliers, a plurality of adders, and a plurality of delay units; and
after successfully performing the focus search, performing a focus servo using the optical pickup.

8. The focus search method of claim 7, wherein a frequency and/or an amplitude of the sine wave varies according to multiply factors of the plurality of multipliers.

9. A focus search method comprising:
receiving, low-pass filtering, and outputting a signal output from a focus loop filter, and calculating an average value for the signal output from the focus loop filter during a focus-on; and
if a focus drop occurs after the focus-on and a focus search is performed again, adding a waveform for a focus search and the average value,
wherein the focus search starts from the average value.

10. The focus search method of claim 9, wherein the average value is held during the focus search.

11. The focus search method of claim 9, wherein the focus search method is used even when a defective signal or an anti-shock signal is generated.

12. The focus search method of claim 9, wherein during the focus search, the range of the waveform for the focus search increases in proportion to the number of times the focus search is performed.

13. A focus search method comprising:
driving an optical pickup in response to an average value for a signal output from a focus loop filter during a focus-on; and
if a focus drop occurs after the focus-on and a focus search is performed again, performing the focus search from the average value during the focus-on before the focus drop occurs using the optical pickup.

14. A focus search method comprising:
calculating an average value for the signal output from a focus loop filter during a focus-on;
if a focus drop occurs after the focus-on and a focus search is performed again, generating a waveform for the focus search and adding the waveform for the focus search and the average value; and
performing the focus search within a predetermined focus search range based on the average value.

15. A method of controlling a gain of a servo system, the method comprising:
receiving and adding an error signal and a sine wave output from a sine wave generator, and outputting the addition result as a first signal;
receiving the first signal, controlling a gain of the first signal, and outputting a signal, a gain of which is controlled;
receiving and adding the error signal and the first signal, and outputting the addition result as a second signal;
receiving and filtering the second signal, and outputting the filtered result as a third signal; and
receiving the sine wave and the third signal, comparing a phase difference between the sine wave and the third signal with a reference phase, and outputting the comparison result as a gain control signal,
wherein the gain of the first signal is controlled in response to the gain control signal.

16. The method of claim 15, wherein the reference phase is 90 degrees.

17. The method of claim 15, wherein the error signal corresponds to the second signal, the gain of which is controlled.

18. The method of claim 15, wherein the third signal is the second signal that is band-pass filtered.

19. The method of claim 15, wherein if the phase difference is greater than the reference phase, a gain of the first signal decreases in response to the gain control signal, and if the phase difference is less than the reference phase, the gain of the first signal increases in response to the gain control signal.

* * * * *

UNITED STATES PATENT AND TRADEMARK OFFICE
CERTIFICATE OF CORRECTION

PATENT NO.        : 7,616,537 B2
APPLICATION NO.   : 10/677192
DATED             : November 10, 2009
INVENTOR(S)       : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1232 days.

Signed and Sealed this

Nineteenth Day of October, 2010

David J. Kappos
*Director of the United States Patent and Trademark Office*